United States Patent
Bennett et al.

(10) Patent No.: US 9,900,300 B1
(45) Date of Patent: Feb. 20, 2018

(54) PROTECTION AGAINST UNAUTHORIZED CLONING OF ELECTRONIC DEVICES

(71) Applicant: IONU SECURITY, INC., Longmont, CO (US)

(72) Inventors: David W. Bennett, Longmont, CO (US); Alan M. Frost, Reno, NV (US)

(73) Assignee: IONU Security, Inc., Longmont, CO (US)

( * ) Notice: Subject to any disclaimer, the term of this patent is extended or adjusted under 35 U.S.C. 154(b) by 336 days.

(21) Appl. No.: 14/693,476

(22) Filed: Apr. 22, 2015

(51) Int. Cl.
*G06F 7/04* (2006.01)
*H04L 29/06* (2006.01)
*G06F 21/45* (2013.01)
*H04L 29/08* (2006.01)

(52) U.S. Cl.
CPC .............. *H04L 63/08* (2013.01); *G06F 21/45* (2013.01); *H04L 67/143* (2013.01)

(58) Field of Classification Search
CPC ........ H04L 63/08; H04L 67/143; G06F 21/45
USPC ........................................................... 726/6
See application file for complete search history.

(56) References Cited

U.S. PATENT DOCUMENTS

| | | | | |
|---|---|---|---|---|
| 2003/0061488 A1* | 3/2003 | Huebler | .................. | H04W 8/22 713/176 |
| 2003/0152254 A1* | 8/2003 | Ha | .......................... | G06F 21/32 382/124 |
| 2006/0107323 A1* | 5/2006 | McLean | .................. | G06F 21/33 726/23 |
| 2009/0210720 A1* | 8/2009 | Chen | ....................... | G06F 21/46 713/180 |
| 2014/0018040 A1* | 1/2014 | Kim | ...................... | H04W 12/06 455/411 |
| 2015/0195280 A1* | 7/2015 | Toyonaga | ............. | H04L 63/123 713/155 |

* cited by examiner

*Primary Examiner* — Teshome Hailu
(74) *Attorney, Agent, or Firm* — Crawford Maunu PLLC

(57) ABSTRACT

In an approach for protecting against use of clones of electronic devices, a first sequence value is initialized on the server and an equal second sequence value is initialized on an electronic device. In response to a first login request to the server from a user operating the electronic device, the first and second sequence values are compared. If the values are equal, processing of the login process continues. Otherwise, the login request is rejected. If the login is successful, a next value is computed for the first and second sequence values, and the next first and second sequence values are stored on the server and on the electronic device, respectively.

20 Claims, 4 Drawing Sheets

PROTECTION AGAINST UNAUTHORIZED CLONING OF ELECTRONIC DEVICES

FIELD OF THE INVENTION

The disclosure generally relates to approaches for protecting against unauthorized cloning of electronic devices.

BACKGROUND

Prior to the advent of high-speed communications and the proliferation of mobile computing devices such as notebook computers, tablet computers, and smart phones, a user typically accessed data via a single device. With limited means of accessing data, a password and simple encryption often sufficed for security. Now, with a user having access to multiple workstations and mobile computing devices, data may be accessed almost anywhere. Enhanced security measures are not only desired but in many applications required.

In trusted and secure computing environments, validation beyond login credentials, which typically include a user name and password, may be desirable for account and network access. Through careless user actions, malware, phishing, hacking, password cracking and other means, a user's login credentials may be exposed and used for unauthorized access to a user's account.

There are two commonly used general approaches for providing an additional level of security to help prevent unauthorized access to a user's account. In one approach, a distinct physical item is linked to the user's account. For example, the physical item may be a smart card, badge, token or biometric information that only the authorized user would possess. The physical item is used in addition to login credentials to gain access to the user's account.

In another approach, a user is required to specifically authorize each device by providing multi-factor authentication, which may be a code or secret sent via email, text message or other out of band means. The multi-factor authentication may alternatively or additionally include other information that only the authorized user would know or have, such as answers to security questions. The multi-factor authentication information may be saved, generally in encrypted form, on the user's device. Subsequent logins can validate that the device was previously authorized by the user and not require the user to provide additional validation at each login. By limiting access to a specific user account to devices that have been authenticated, unauthorized access to a user's account may be prevented from other devices. The user's devices may be physical devices, such as a smartphone, tablet, laptop, desktop or other physical computing device, or a virtual device such as an application running on a virtual machine, in a browser or other software environment.

Though multi-factor authentication provides added protection against unauthorized account access, a user's account may be prone to attack through cloning of a user's device. An attacker with physical or remote access to one of the user's devices could clone the device, by copying the relevant data or the entire disk on which the authentication information is saved. Backup and restore utilities, which are normally used for non-malicious purposes, may be used to transfer applications and associated data from a user's device to an attacker's device. If an attacker were to obtain physical or remote access to a device, clone the device and acquire the user's name and password, the attacker could then create an additional authorized device and bypass the extra authentication that is normally required to add an additional device to an account.

For some multi-factor authentication information, an attacker may require physical access to the device. For example, physical access may be required to access the Unique Device Identifier (UDID), the International Mobile Equipment Identity (IMEI) number, WLAN MAC address, Bluetooth address or other device specific identification values. Given physical access to the device, such device identification information may be readily obtained, and techniques exist to spoof or clone the identification information and to pass off as coming from the original device. Mobile phone service providers have a variety of techniques for detecting a cloned phone on their cellular networks, such as the authentication provided by SIM cards and radio fingerprinting. However, these techniques are generally unavailable to anyone other than the cellular carrier and are thereby unable to provide protection to other accounts from a cloned device. A cloned device could authenticate using its legitimate credentials on the cellular network, whilst using the cloned information to access another user account. Using a WiFi connection instead of the cellular network further masks the cloned device from existing detection schemes.

SUMMARY

A method of protecting against use of clones of electronic devices is provided in one embodiment. The method includes initializing by a computer processor, a first sequence value on a server and a second sequence value on an electronic device. The first sequence value and the second sequence value initially are equal. In response to a login request to the server from a user operating the electronic device, the first and second sequence values are compared. If the first and second sequence values are equal, processing of the login request continues. If the first and second sequence values are not equal, the login request is rejected. If the user successfully logs in to the server, a next value is computed for the first and second sequence values, and the next value is stored as the first sequence value on the server and as the second sequence value on the electronic device, respectively.

In another embodiment, a system for protecting against use of clones of electronic devices is provided. The system includes a computer processor and a memory arrangement coupled to the computer processor. The memory arrangement is configured with instructions that when executed by the processor cause the processor to initialize a first sequence value on the server and a second sequence value on an electronic device. The initialized first and second sequence values are equal. In response to a login request from a user operating the electronic device, the first and second sequence values are compared. If the first and second sequence values are equal, processing of the login request continues. If the first and second sequence values are not equal, the login request is rejected. In response to a successful login of the user with the login request to the server, a next value of the first sequence value is computed and stored in the memory arrangement.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings in which:

FIG. 3 shows a flowchart of a process for periodically checking the sequence values on the server and device, outside the login process and while the user is not logged in.

DETAILED DESCRIPTION OF THE DRAWINGS

Figure 1:
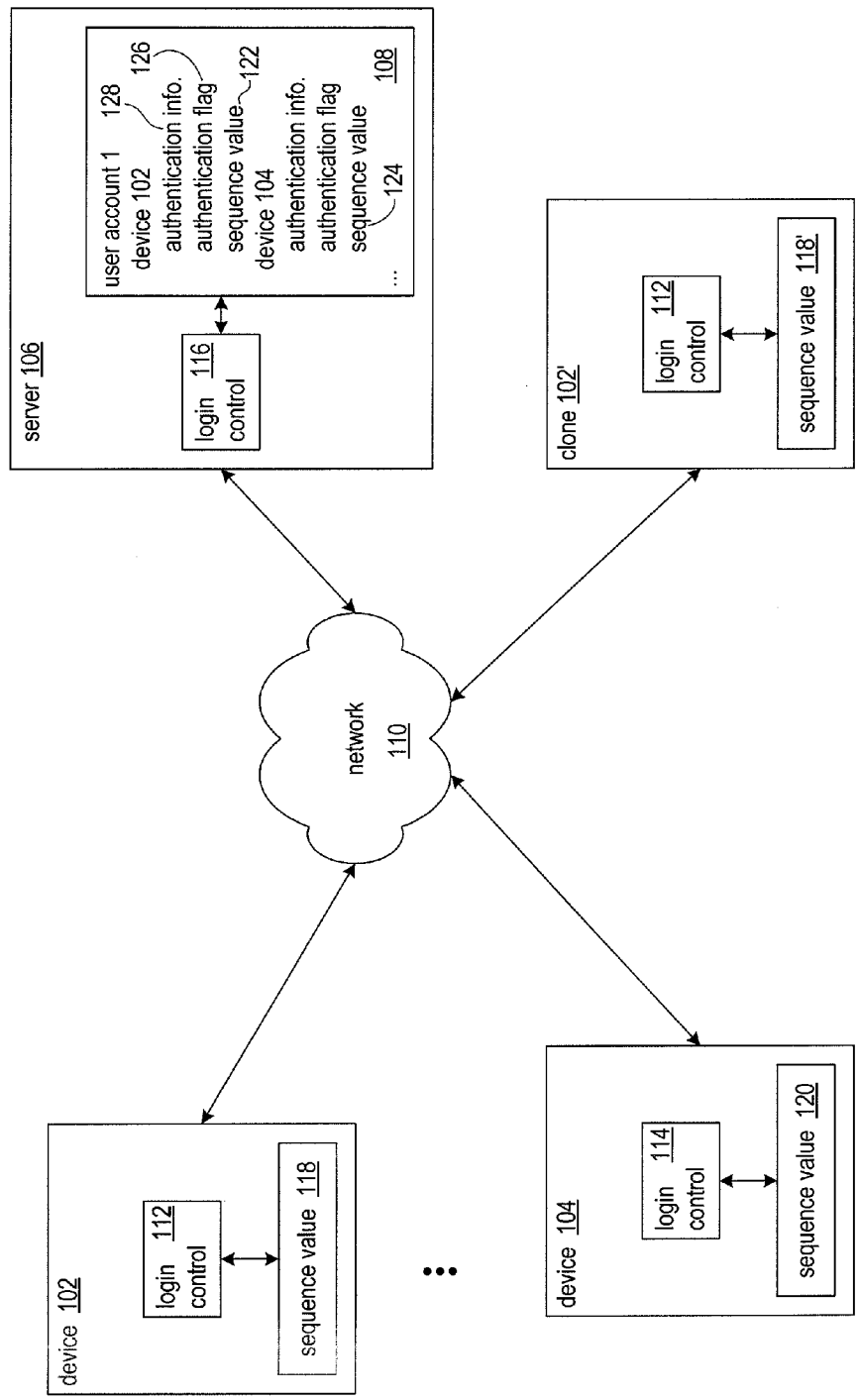
FIG. 1 shows multiple devices connected to a server.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Though methods exist for detecting whether a user is logged in from multiple devices, the multiple sessions may be desired by a user who is accessing account messages on one device and viewing an account document on another device. Also, current approaches may detect concurrent login sessions from a user's valid device and a clone of the device. However, current approaches may be unable to distinguish between the valid device and the clone, which leaves the user's account susceptible to a login via the clone.

The methods and systems disclosed herein provide a number of approaches that protect against use of unauthorized clones of electronic devices. The approaches generally rely on identical sequence values being maintained and updated on a server and on an electronic device through which a user accesses protected information on the server. Examples of protected information include a user's own information or information provided by a service provider.

To protect against unauthorized clones, respective sequence values are initialized to equal values on the server and on an electronic device through which a user has the capability to login to the server. When a user attempts to login to the server via the electronic device, the server compares the sequence values. If the sequence values are equal, the server continues with the login process. If the login is successful, a new sequence value is computed and stored on the server and on the electronic device. If the sequence values are not equal, the login process is terminated, and access to the protected information is denied. In addition, the login failure removes authorization for login with the device to the server, and the user is forced to re-authenticate the device with the server in order to login.

The sequence values on the server and electronic device protect against unauthorized use of a clone to login to the server. If a device is cloned, the clone would initially have the same sequence value as the authorized device and the server. If a user successfully logs-in to the server with the authorized device before an attempt is made to login via the clone, the sequence values on the authorized device and the server will be the same, but the sequence value on the clone will be different. The different sequence value on the clone prevents login via the clone. An unauthorized login via the clone may be successful if the login via the clone is attempted prior to login via the authorized device. However, periodic checks of the sequence value between the authorized device and the server may reduce the time that one can be logged in to the server via the clone.

FIG. 1 shows multiple devices connected to a server. Devices 102 and 104 may be electronic devices such as smart phones, tablet computers, notebook computers, or desktop computers running application programs or browsers, through which a user accesses an account on the server. In the example, the devices 102 and 104 belong to or are controlled by the same user. The server 106 controls access to protected information of one or more users. The server may include multiple computer systems and provide services such as cloud storage, computing services, or information services, for example. The server 106 maintains a database 108 of user accounts, and each user account has device identifiers of authorized devices. Each device identifier has associated authentication information, an authentication flag, and a sequence value. Each sequence value is used in conjunction with the authentication information to determine whether or not a device is authorized or is an unauthorized clone of a device.

The server 106 and devices 102 and 104 are configured with software that provides login control and authentication functions over network 110. Devices 102 and 104 execute login control software 112 and 114, respectively, and the server executes login control software 116. The login control software elements executing on the devices and the server coordinate user login through the devices to the server. Actions by the login control elements may include verification of username and password, validation of sequence numbers, and authentication of devices. The secure sockets layer (SSL), transport layer security (TLS), virtual private network (VPN) or other secure networking protocols may be used to ensure secured transmission of data between the devices and the server.

A respective sequence value is stored in memory of each of devices 102 and 104. Sequence value 118 is stored on device 102 and sequence value 120 is stored on device 104. The database 108 on server 106 stores sequence values that correspond to the sequence values 118 and 120. Sequence value 122, which is associated with the device identifier of device 102 in the database 108, corresponds to sequence value 118, and sequence value 124, which is associated with the device identifier of device 104 in the database, corresponds to sequence value 120. Corresponding sequence values are initialized to equal values, and in an example implementation, the initial values are generated with a cryptographically secure random number generator. A single sequence value may be initialized on either the server or on a device. If the sequence value is initialized on the server, the sequence value is encrypted and transmitted to the device. If the sequence value is initialized on the device, the sequence value is encrypted and transmitted to the server. Standard techniques for cryptographic key exchange or pre-shared secrets used to derive keys may be used. The sequence values stored on the server and on the devices would be encrypted.

Device 102' is an unauthorized clone of device 102. As device 102' is a clone, it includes login control element 112 and a sequence value 118'. At the time that clone 102' is made, sequence values 118 and 118' would be equal. The clone 102' may also include the authentication information of device 102 so that the clone 102' initially appears to be authentic to the server 106.

In response to a login request from a user operating one of the electronic devices, the server 106 decrypts and compares the sequence values of the device and the server. For example, if a user is logging in from device 102, the server decrypts and compares the sequence value 118 and the corresponding sequence value 122. If the sequence values are equal, the server and device may continue with or complete the login process. If the login is successful, a next value of the sequence value is computed, encrypted, and stored on both the device and server. The next sequence value may be computed as a function of the current sequence such as by incrementing or decrementing the current sequence value or by performing a more complex function. For some implementations, the next sequence value may be computed using a pseudo-random number generator and using the current sequence value as a seed. The new sequence value is then encrypted and stored on both the server and device. The next sequence value may be computed independently on the device and server, using the same mathematical function, or it could be computed on either the device or server and transmitted in encrypted form to the other.

If the server determines that the sequence value from the device is not equal to the sequence value stored on the server, the login process is terminated. The server may respond to the device that made the login request with a rejection status code. The sequence value on an authorized device and the corresponding sequence value on the server may become unsynchronized as a result of a user logging in via a clone of the device. Once detected, the sequence value on the server may be changed to prevent subsequent logins via the clone.

When the server detects that the authorized device and the server have different sequence values and rejects a login request, the server may terminate each login session of the user. For example, if an unauthorized user is currently logged in via clone 102' to the user's account and the authorized user attempts a login via device 102, the server may terminate the login session of the unauthorized user along with every other login session under the authorized user's account. The server then reinitializes the sequence value and stores a value for an authentication flag 126 that is associated with the device identifier of device 102. The updated value of the authentication flag indicates that device 102 needs to be re-authenticated before a user can successfully login.

In response to a login request, such as from device 102, the server 106 checks the state of the authentication flag 126 associated with the device identifier of device 102 in the database 108. If the flag value indicates that authentication of the electronic device is required, the server forces authentication of the device. Multi-factor authentication information for each device is associated with the device identifier in the database 108 on the server. For example, the multi-factor authentication information 128 is associated with the device identifier for device 102 and may include a code or secret, and/or other information that only the authorized user would know or have, such as answers to security questions. The server obtains multi-factor authentication information from the user of device 102 and determines whether or not the newly provided information matches that stored in the database 108. Once authenticated, a new sequence value is initialized, encrypted, and stored on the device and on the server. In addition, the authentication flag associated with the device identifier of the re-authenticated device is updated with a value that indicates that authentication of the device is not required.

In some implementations, the server may use a sequence gap threshold in conjunction with the sequence values on the server and on a device to control whether or not the device should be re-authenticated. The sequence gap threshold is used to prevent unnecessary re-authentication of a device once a clone has been discovered and the authorized device has been re-authenticated. The magnitude of the difference between sequence values is used to determine whether or not to force re-authentication of the device. In a scenario involving use of the sequence gap threshold, the server detects a clone and forces a user to re-authenticate the device at the next login. Once the user has successfully re-authenticated the device, the sequence values on the server and on the device are re-initialized. The newly initialized sequence value is such that the separation between the new sequence value and the sequence value prior to re-initialization is greater than the sequence gap threshold. If another login from the clone is attempted, the server will determine that the difference between the server's sequence value and the clone's sequence value is greater than the sequence gap threshold, which indicates that the login is likely another attempt from the clone. That is, the absolute value of the difference between the new sequence value and the previous sequence value is greater than a sequence gap threshold. In recognizing another login attempt from the clone after the device has been re-authenticated, the server does not again force re-authentication.

In an alternative implementation, instead of using a sequence gap threshold to limit unnecessary re-authentication of an authorized device once a clone has been detected and the authorized device has been re-authenticated, the user may be forced to change a password. That is, the server may be configured to force a password change in response to a login request from the authorized device and the value of the authentication flag indicating that authentication of the electronic device is required. Once the user's password is changed, subsequent attempts to login via the clone will fail, because the password provided by the clone will be incorrect. As login via the clone failed, the value of the authentication flag will not be changed to indicate that authentication is required.

In an alternative implementation, the sequence checking may be performed on the device during the login process instead of being performed on the server. The server sends the encrypted sequence value to the device during the login process. In response to the sequences not matching, the device may de-authenticate itself as part of the login failure. Subsequent login attempts from that device would then trigger the standard multi-factor authentication process for a new device on the user's account. The holder of the clone would not have the multi-factor information required to successfully complete the authentication process, thereby disabling the clone.

In another approach for limiting the time during which an unauthorized user may access a user's account via a clone, the server, or each authorized device, may be configured to periodically check for consistency between the sequence values while the user is not logged in to the server via the device. If the sequence values are not equal, the sequence value on the server is reinitialized. In addition, the server may close all active login sessions between the authorized user's devices and the server.

Figure 2:
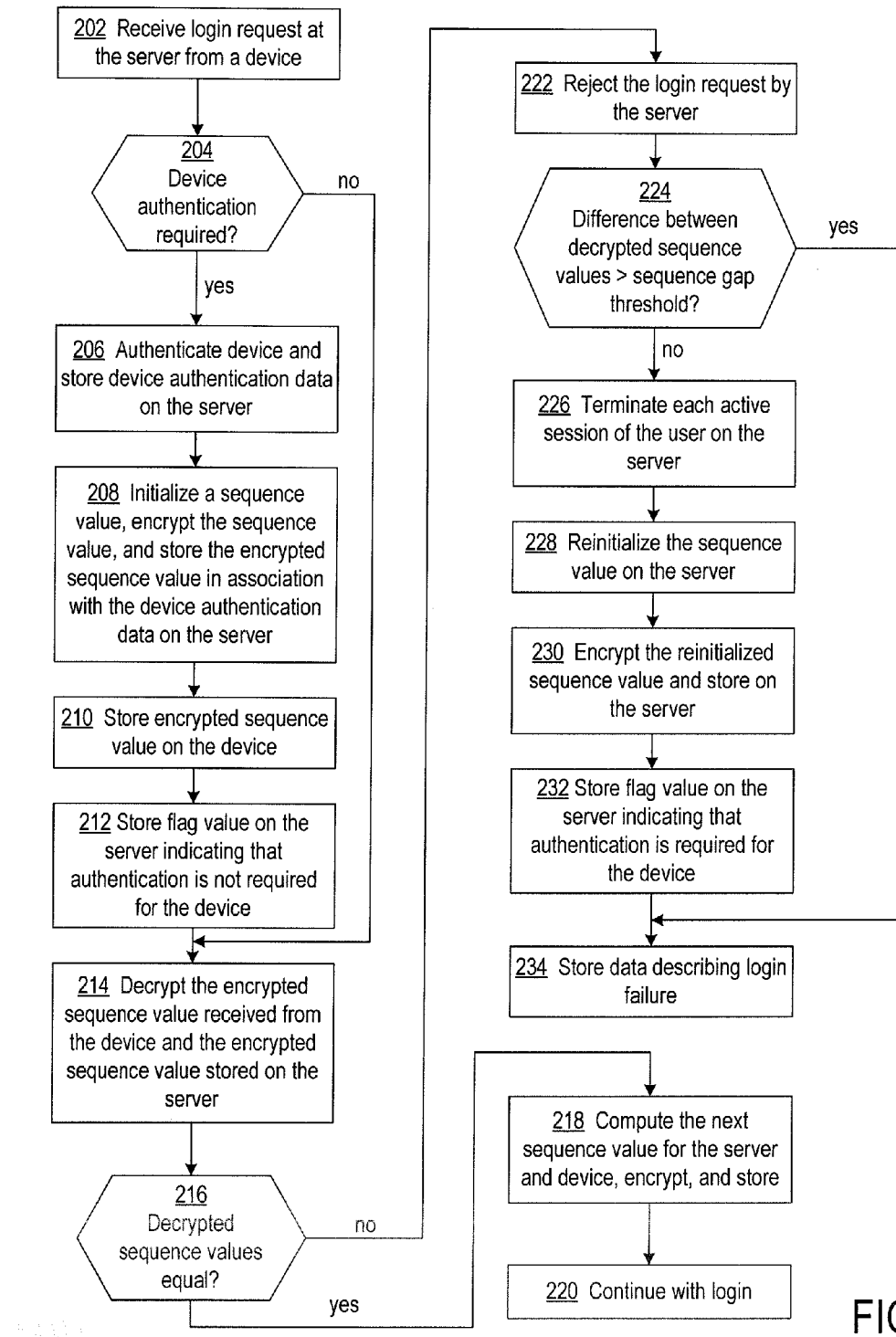
FIG. 2 shows a flowchart of a process for protecting against unauthorized use of a clone of a device.

FIG. 2 shows a flowchart of a process for protecting against unauthorized use of a clone of a device. Aspects of the process may be implemented by the examples of electronic devices and server as shown in FIG. 1 and described above.

At block 202, the server receives and commences processing a login request from an electronic device. The login request may include a username and password. If the username and password are correct, processing of the login request continues at decision block 204. Otherwise, the login processing terminates. Decision block 204 determines whether or not authentication of the device is required. The requirement for authentication may be indicated by the value of an authentication flag that is associated with the device identifier of the device that submitted the login request.

If authentication is required, the process continues at block 206. Otherwise, if no authentication is required, the process continues at block 214. At block 206, the device is authenticated. For example, the authentication may entail requesting from the user of the device a code or secret, and/or other information that only the authorized user would know or have, such as answers to security questions. If the device is not authenticated, the process terminates. Otherwise, processing continues at block 208 where a sequence value is initialized, encrypted, and stored on the server. The sequence value is stored in association with the device identifier of the device that submitted the login request. At block 210, the encrypted sequence value is also stored on the device. At block 212, the authentication flag associated with the device identifier of the requesting device is set to a value indicating that authentication of the device is not required. Note that the process may proceed from block 212 to block 220 in some implementations since the sequence values were just initialized at blocks 208 and 210 and verification may be unnecessary.

At block 214, the process commences verification of the sequence values from the server and requesting device. The login request from the device may include an encrypted sequence value from the device. The server decrypts the sequence value from the device and the corresponding sequence value stored on the server at block 214. Decision block 216 determines whether or not the decrypted sequence values are equal. If the sequence values are equal, at block 218, the process computes the next sequence value for the server and the device. The next sequence value may be computed as a function of the current sequence such as by incrementing or decrementing the current sequence value or by performing a more complex function. For some implementations, the next sequence value may be computed using a pseudo-random number generator and using the current sequence value as a seed. If a sequence gap threshold is used, the pseudo-random number generator may be restricted to a range of values, such that if the sequence value is reinitialized, the reinitialized sequence value will be in a different range that is beyond the sequence gap threshold. The new sequence value is then encrypted and stored on both the server and device. At block 220, the process continues with any further login procedures, if any, or completes the login process.

If the decrypted sequence values are not equal, decision block 216 directs the process to block 222. At block 222, the login request is rejected by the server. In one implementation, the server may send a rejection message to the device indicating that the login failed. Decision block 224 determines the absolute value of the difference between the sequence values and determines whether or not the absolute value of the difference is greater than the sequence gap threshold. If the absolute value of the difference is greater than the sequence gap threshold, then the clone has likely already been detected and re-authentication need not be forced and the processing of blocks 226, 228, 230, and 232 may be bypassed, and information describing the login failure may be stored at block 234. If the absolute value of the difference is not greater than the sequence gap threshold, the clone has likely just been detected, and the process proceeds to block 226.

At block 226, each active session of the user on the server is terminated. A session generally begins with a successful login by a user through a device to the server and ends when the user logs out through that device. During a session, the user may access different programs or data hosted by the server and information may be exchanged between the device and the server. For some applications, a user may have multiple sessions concurrently active. Some applications may permit a user to login and begin multiple sessions between one device and one server.

The sequence value is reinitialized on the server at block 228. The new sequence value is separated from the previous sequence value by more than the sequence gap threshold. That is, the absolute value of the difference between the previous sequence value and the new sequence value is greater than the sequence gap threshold. If a pseudo-random number generator is used, the new value may be restricted to a range that is separated from the range of the previous sequence value by more than the sequence gap threshold. The re-initialization of the sequence value at block 228 effectively invalidates the sequence value.

In an alternative implementation, a password change may be forced instead of using a sequence gap threshold at blocks 224 and 228 to limit unnecessary re-authentication. If a password change scheme is used, decision block 224 is unnecessary, and re-authentication may require the user to change a password.

At block 230, the new sequence value is encrypted and stored on the server. At block 232, a flag value is stored on the server for the authentication flag associated with the device identifier of the device through which the login was attempted. The flag value indicates that authentication is required for the device. The next time a login is attempted through the device, the user will be required to provide multi-factor authentication to the server as described above. Information describing the login failure may be stored at block 234.

Figure 3:
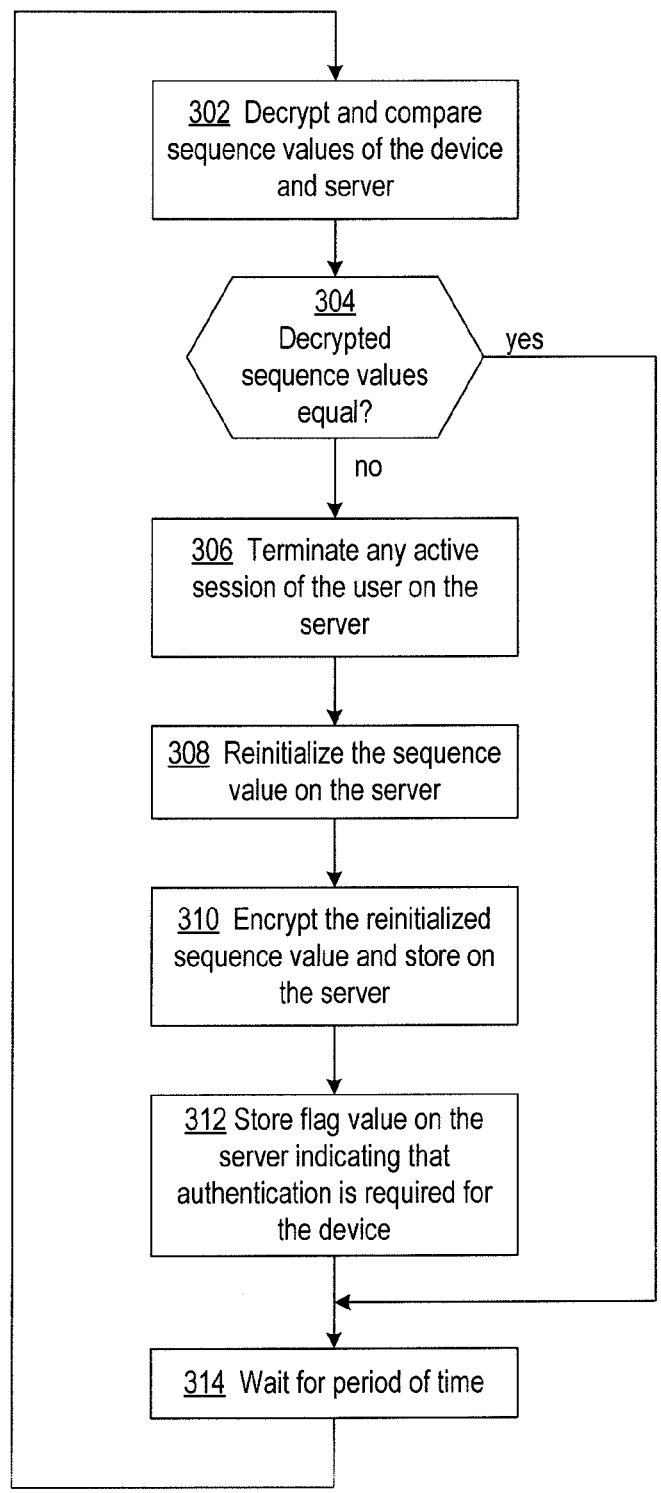

FIG. 3 shows a flowchart of a process for periodically checking the sequence values on the server and device, outside the login process and while the user is not logged in. The device may periodically send the sequence value to the server, unsolicited, or the server may periodically request the sequence value from the device.

At block 302, the server decrypts and compares the sequence values from the server and the device. Decision block 304 compares the decrypted sequence values and determines whether or not the values are equal. If the values are equal, the process proceeds to block 314 to wait. Otherwise, the process continues at block 306. The processing of blocks 306, 308, 310, and 312 is as described for blocks 226, 228, 230, and 232 of FIG. 2.

At block 314, the process waits for a period of time before repeating the verification of the sequence values. If the device pushes the sequence value to the server, the device waits for a period of time and after waiting sends the current sequence value to the server, and the server waits to receive the next sequence value. If the server pulls the sequence value from the device, the server waits for a period of time and after waiting sends a request to the device. The device waits to receive a request from the server.

Figure 4:
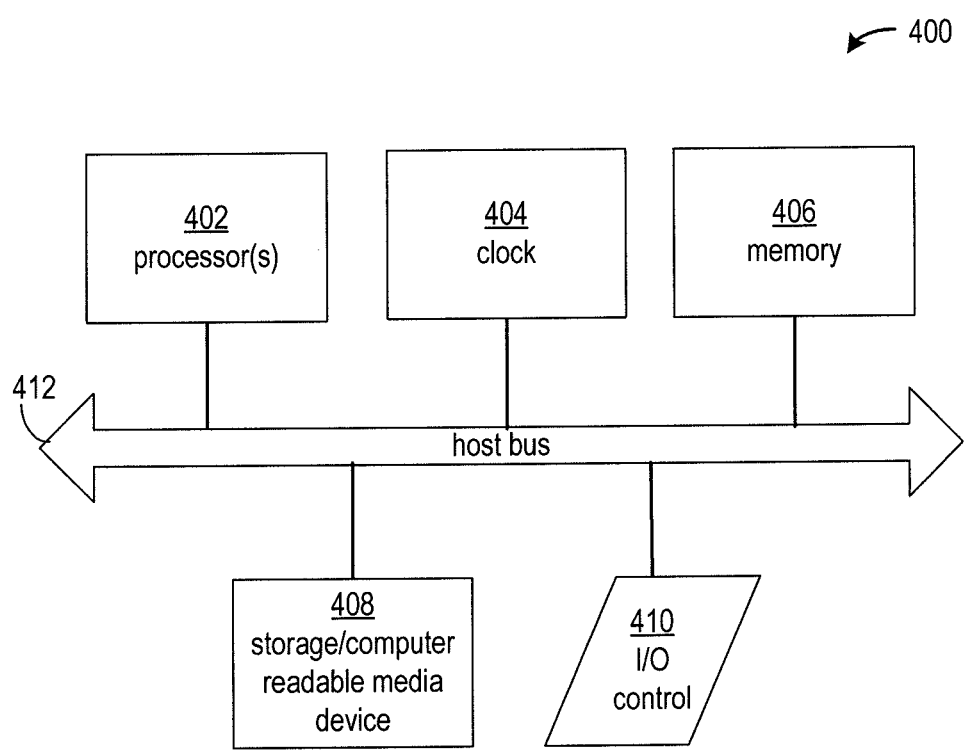
FIG. 4 is a block diagram of an example computing arrangement.

FIG. 4 is a block diagram of an example computing arrangement on which the processes described herein may be implemented. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 400 includes one or more processors 402, a clock signal generator 404, a memory arrangement 406, a storage arrangement 408, and an input/output control arrangement 410, all coupled to a host bus 412. The arrangement 400 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 402 may be one or more general purpose processors, or a combination of one or more general purpose processors and suitable co-processors, or one or more specialized processors (e.g., RISC, CISC, pipelined, etc.).

The memory arrangement 406 typically includes multiple levels of cache memory, and a main memory. The storage arrangement 408 may include local and/or remote persistent storage, such as provided by magnetic disks (not shown), flash, EPROM, or other non-volatile data storage. The storage unit may be read or read/write capable. Further, the memory arrangement 406 and storage arrangement 408 may be combined in a single arrangement.

The processor(s) 402 executes the software in storage arrangement 408 and/or memory arrangement 406, reads data from and stores data to the storage arrangement 408 and/or memory arrangement 406, and communicates with external devices through the input/output control arrangement 410. These functions are synchronized by the clock signal generator 404. The resource of the computing arrangement may be managed by either an operating system (not shown), or a hardware control unit (not shown).

Though aspects and features may in some cases be described in individual figures, it will be appreciated that features from one figure can be combined with features of another figure even though the combination is not explicitly shown or explicitly described as a combination.

The methods and systems are thought to be applicable to a variety of systems for generating cryptographic keys. Other aspects will be apparent to those skilled in the art from consideration of the specification. The methods and systems may be implemented as one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A method of protecting against use of clones of an electronic device, comprising:
   initializing by a computer processor, a first sequence value on a server and a second sequence value on the electronic device, the first sequence value and the second sequence value initially being equal;
   in response to a first login request to the server from a user operating the electronic device:
      comparing the first and second sequence values,
      continuing processing of the first login request in response to the first and second sequence values being equal, and
      rejecting the first login request in response to the first and second sequence values being unequal;
   in response to a successful login of the user with the first login request to the server:
      computing a next value for the first and second sequence values, respectively, and
      storing the next value as the first sequence value on the server and as the second sequence value on the electronic device, respectively; and
   in response to the rejection of the first login request:
      terminating every active login session of the user through every other electronic device on the server,
      reinitializing the first sequence value on the server, and
      storing on the server a flag value indicating that authentication of the electronic device is required.

2. The method of claim 1, further comprising:
   encrypting the first and second sequence values into encrypted first and second sequence values;
   storing on the server the encrypted first sequence value in association with information describing the electronic device and storing the encrypted second sequence value on the electronic device;
   sending the encrypted second sequence value from the electronic device to the server with the first login request;
   decrypting by the server the encrypted first and second sequence values into decrypted first and second sequence values, respectively; and
   comparing the decrypted first and second sequence values by the server.

3. The method of claim 1, further comprising:
   in response to a second login request from the electronic device and the flag value indicating that authentication of the electronic device is required:
      authenticating the electronic device with the server,
      initializing the first and second sequence values on the server and on the electronic device, respectively,
      storing the first and second sequence values on the server and on the electronic device, respectively, and
      storing on the server a flag value indicating that authentication of the electronic device is not required.

4. The method of claim 3, wherein the initializing the first and second sequence values on the server and on the electronic device in response to the second login request from the electronic device and the flag value indicating that authentication of the electronic device is required, includes assigning to the first and second sequence values a new value, wherein an absolute value of a difference between the new value and a previous value of the first sequence value is greater than a sequence gap threshold.

5. The method of claim 3, further comprising forcing a password change in response to the second login request from the electronic device and the flag value indicating that authentication of the electronic device is required.

6. The method of claim 1, further comprising:
   periodically checking for consistency between the first and second sequence values while the user is not logged in to the server by the electronic device; and
   in response to the first and second sequence values being inconsistent, reinitializing the first sequence value on the server.

7. The method of claim 1, further comprising:
   in response to the rejection of the first login request:
      determining a difference between the first sequence value and the second sequence value;
      in response to an absolute value of the difference being less than a sequence gap threshold, terminating every active login session of the user through every other electronic device on the server, reinitializing the first sequence value on the server, and storing on the server a flag value indicating that authentication of the electronic device is required; and in response to the difference being greater than the sequence gap threshold, bypassing the terminating, reinitializing, and storing of the flag value.

8. The method of claim 1, wherein the initializing includes:

generating a random number as the first sequence value by the computer processor of the server;

transmitting the first sequence value to the electronic device, wherein the electronic device receives the first sequence value as the second sequence value;

storing the first sequence value in memory of the server; and storing the second sequence value in memory of the electronic device.

9. The method of claim 1, wherein the initializing includes:

generating a random number as the second sequence value by the computer processor of the electronic device;

transmitting the second sequence value to the server, wherein the server receives the second sequence value as the first sequence value;

storing the first sequence value in memory of the server; and storing the second sequence value in memory of the electronic device.

10. The method of claim 1, wherein the comparing is performed by a computer processor on the server.

11. The method of claim 1, further comprising storing the second sequence value on the electronic device and wherein the comparing is performed by a computer processor on the electronic device.

12. A system for protecting against use of clones of an electronic device, comprising:

a computer processor;

a memory arrangement coupled to the computer processor, wherein the memory arrangement is configured with instructions that when executed by the computer processor cause the computer processor to:

initialize a first sequence value on a server and a second sequence value on the electronic device, wherein the initialized first and second sequence values are equal;

in response to a first login request from a user operating the electronic device:

compare the first and second sequence values, continue processing of the first login request in response to the first and second sequence values being equal, and reject the first login request in response to the first and second sequence values being unequal;

in response to a successful login of the user with the first login request to the server:

compute a next value of the first sequence value, and store the next value in the memory arrangement; and in response to the rejection of the first login request:

terminate every active login session through every other electronic device of the user, reinitialize the first sequence value, and store in the memory arrangement a flag value indicating that authentication of the electronic device is required.

13. The system of claim 12, wherein the memory arrangement is further configured with instructions that when executed by the computer processor cause the computer processor to:

encrypt the first sequence value into an encrypted first sequence value;

store in the memory arrangement the encrypted first sequence value in association with information describing the electronic device;

receive an encrypted second sequence value from the electronic device with the first login request;

decrypt the encrypted first and second sequence values into decrypted first and second sequence values, respectively; and compare the decrypted first and second sequence values.

14. The system of claim 12, wherein the memory arrangement is further configured with instructions that when executed by the computer processor cause the computer processor to:

in response to a second login request from the electronic device and the flag value indicating that authentication of the electronic device is required:

authenticate the electronic device, initialize the first sequence value, store the first sequence value in the memory arrangement, and store in the memory arrangement a flag value indicating that authentication of the electronic device is not required.

15. The system of claim 14, wherein the instructions for initialization of the first and second sequence values on the server and on the electronic device in response to the second login request from the electronic device and the flag value indicating that authentication of the electronic device is required, include instructions that when executed by the computer processor cause the computer processor to assign to the first sequence value a new value, wherein an absolute value of a difference between the new value and a previous value of the first sequence value is greater than a sequence gap threshold.

16. The system of claim 14, wherein the memory arrangement is further configured with instructions that when executed by the computer processor cause the computer processor to force a password change in response to the second login request from the electronic device and the flag value indicating that authentication of the electronic device is required.

17. The system of claim 12, wherein the memory arrangement is further configured with instructions that when executed by the computer processor cause the computer processor to:

periodically check for consistency between the first and second sequence values while the user is not logged in to the server by the electronic device; and in response to the first and second sequence values being inconsistent, reinitialize the first sequence value on the server.

18. The system of claim 12, wherein the memory arrangement is further configured with instructions that when executed by the computer processor cause the computer processor to:

in response to the rejection of the first login request:
   determine a difference between the first sequence value and the second sequence value;
   in response to an absolute value of the difference being less than a sequence gap threshold,
      terminate every active login session through every other electronic device of the user,
      reinitialize the first sequence value, and
      store in the memory arrangement a flag value indicating that authentication of the electronic device is required; and
   in response to the difference being greater than the sequence gap threshold,
      bypass the terminating, reinitializing, and storing of the flag value.

19. The system of claim 12, wherein the instructions for the initialization include instructions that when executed by the computer processor cause the computer processor to:
   generate a random number as the first sequence value;
   transmit the first sequence value from the server to the electronic device, wherein the electronic device receives the first sequence value as the second sequence value; and
   store the first sequence value in the memory arrangement.

20. The system of claim 12, wherein the instructions for the initialization include instructions that when executed by the computer processor cause the computer processor to:
   receive from the electronic device the first sequence value; and
   store the first sequence value in the memory arrangement.

* * * * *